(12) United States Patent
Wolf et al.

(10) Patent No.: US 9,317,323 B2
(45) Date of Patent: Apr. 19, 2016

(54) DYNAMIC EXECUTION LOG IN A DISTRIBUTED SYSTEM

(71) Applicant: Microsoft Technology Licensing, LLC, Redmond, WA (US)

(72) Inventors: Kenneth David Wolf, Seattle, WA (US); Jesus Ruiz-Scougall, Sammamish, WA (US); Nathan Christopher Talbert, Seattle, WA (US); Clark Roberts, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 259 days.

(21) Appl. No.: 13/727,401

(22) Filed: Dec. 26, 2012

(65) Prior Publication Data

US 2014/0181826 A1    Jun. 26, 2014

(51) Int. Cl.
G06F 9/46 (2006.01)
G06F 15/173 (2006.01)
G06F 9/48 (2006.01)

(52) U.S. Cl.
CPC .................................... *G06F 9/4843* (2013.01)

(58) Field of Classification Search
None
See application file for complete search history.

(56) References Cited

U.S. PATENT DOCUMENTS

| | | | |
|---|---|---|---|
| 5,889,674 A * | 3/1999 | Burdick et al. | 700/121 |
| 7,024,668 B2 * | 4/2006 | Shiomi et al. | 718/1 |
| 7,093,259 B2 * | 8/2006 | Pulsipher et al. | 718/106 |
| 7,386,586 B1 * | 6/2008 | Headley et al. | 709/202 |
| 7,484,221 B2 | 1/2009 | Rivera et al. | |
| 7,672,924 B1 | 3/2010 | Scheurich et al. | |
| 7,716,672 B2 | 5/2010 | Douceur et al. | |
| 7,930,684 B2 | 4/2011 | Roeck et al. | |
| 8,056,079 B1 * | 11/2011 | Martin et al. | 718/102 |
| 8,250,131 B1 | 8/2012 | Pulsipher | |
| 2001/0012986 A1 * | 8/2001 | Conan et al. | 702/188 |
| 2002/0184294 A1 * | 12/2002 | Volkoff et al. | 709/104 |
| 2003/0154115 A1 * | 8/2003 | Lahey et al. | 705/8 |
| 2004/0015968 A1 * | 1/2004 | Neiman et al. | 718/100 |
| 2007/0233870 A1 * | 10/2007 | Goto et al. | 709/226 |
| 2007/0239505 A1 | 10/2007 | Shukla et al. | |
| 2011/0145826 A1 | 6/2011 | Talbert et al. | |
| 2011/0154338 A1 * | 6/2011 | Ramanathaiah et al. | 718/100 |
| 2011/0289503 A1 | 11/2011 | Toub et al. | |
| 2012/0054754 A1 | 3/2012 | Teichmann et al. | |
| 2012/0110589 A1 * | 5/2012 | Ghosh et al. | 718/104 |

(Continued)

OTHER PUBLICATIONS

"Servicing Background Tasks on a Large Site", Retrieved on: Nov. 22, 2012, Available at: http://programmers.stackexchange.com/questions/13711/servicing-background-tasks-on-a-large-site.

(Continued)

*Primary Examiner* — Abdullah Al Kawsar
(74) *Attorney, Agent, or Firm* — Kevin Sullivan; Doug Barker; Micky Minhas

(57) ABSTRACT

Scheduling and dispatching jobs for a plurality of different entities. A method includes receiving at a work coordinator, one or more actions associated with a job. The method further includes storing in a log at the work coordinator, keyed on a job key, state for the one or more actions and a list of the one or more actions. The method further includes making calls to one or more worker processes to cause the worker process to perform actions associated with the job. As a result of making calls to one or more worker processes, the method further includes receiving at least one of a change to the list of remaining actions or the state.

18 Claims, 3 Drawing Sheets

(56) References Cited

U.S. PATENT DOCUMENTS

| | | | |
|---|---|---|---|
| 2012/0158453 A1 | 6/2012 | Chung et al. | |
| 2012/0260118 A1 | 10/2012 | Jiang et al. | |
| 2014/0032743 A1* | 1/2014 | Hiscock et al. | 709/224 |
| 2014/0115598 A1* | 4/2014 | Matousek | 718/104 |

OTHER PUBLICATIONS

Litwak, David, "Background Task Processing and Deferred Execution in Django", Retrieved on: Nov. 2012, 2012, Available at: http://www.turnkeylinux.org/blog/django-celery-rabbitmq.

"Grand Central Dispatch (GCD) Reference", Retrieved on: Nov. 22, 2012, Available at: https://developer.apple.com/library/mac/#documentation/Performance/Reference/GCD_libdispatch_Ref/Reference/reference.html.

"SafeGuard Enterprise Administrator help", Published on: Apr. 2011, Available at: http://www.sophos.com/sophos/docs/eng/manuals/sgn_56_h_eng_admin_help.pdf.

Blythe, et al., "Task Scheduling Strategies for Workflow-based Applications in Grids", In IEEE International Symposium on Cluster Computing and the Grid, May 9, 2005, 9 pages.

Wang, et al., "Process as a Service—Distributed Multi-tenant Policy-based Process Runtime Governance", In IEEE International Conference on Services Computing, Jul. 5, 2010, 8 pages.

Huang, et al., "A Workflow for Runtime Adaptive Task Allocation on Heterogeneous MPSoCs", In Proceedings of Design, Automation & Test in Europe Conference & Exhibition, Mar. 14, 2011, 6 pages.

"Gearman: Introduction", Available at least as early as Dec. 5, 2011. Available at <<web.archive.org/web/20111205035702/http:/gearman.org/>>, 3 pages.

"Gearman: Index", Available at least as early as Dec. 1, 2011. Available at <web.archive.org/web/20111201082336/http:/gearman.org/index.php?id=documentation>>, 1 page.

"Welcome to the Gearman documentation!", Available at least as early as Nov. 26, 2011. Available at <web.archive.org/web/20111126074739/http:/gearman.info/>>, 1 page.

"Libgearman", Available at least as early as Nov. 26, 2011. Available at <<web.archive.org/web/20111126073109/http:/gearman.info/libgearman/index.html>>, 3 pages.

"Job (gearmanjob_st)", Available at least as early as Apr. 28, 2012. Available at <web.archive.org/web/20120428201910/httplgearman.info/libgearman/gearman_job_st.html>>, 2 pages.

"Task (gearman_task_st)", Available at least as early as May 11, 2012. Available at <web.archive.org/web/20120511204119/http:/gearman.info/libgearman/gearman_task_st.html>>, 2 pages.

"Logging callback (gearman_log_fn)", Available at least as early as Apr. 28, 2012. Available at <web.archive.org/web/20120428195558/http:/gearman.info/libgearman/gearman_log_fn.html>>, 1 page.

"Introducing Resque", Available at least as early as Nov. 3, 2009. Available at <web.archive.org/web/20100620102650/http:/github.com/blog/542-introducing-resque>>, 11 pages.

* cited by examiner

DYNAMIC EXECUTION LOG IN A DISTRIBUTED SYSTEM

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

Network computing has resulted in the proliferation of web based services and applications. Users access data and direct the performance of computing tasks through web interfaces. However, users nonetheless expect the computing experience to be seamless and "snappy". This can be difficult given that a typical interaction requires sending requests from a client across a network to a server, the server performing some work, and the server returning data to the user at the client. The user experience can be enhanced by, to the extent possible, pre-computing calculations at the server.

Background jobs are used for building truly scalable distributed web applications as they transfer both time and computationally intensive tasks from the web layer to a background process outside the user request/response lifecycle. This helps to ensure that web requests can return immediately and reduces compounding performance issues that occur when requests become backlogged. It also improves the user experience and reliability of an ever more dynamic network edge.

Building such background jobs in distributed environments today is challenging and requires many moving parts. It can often require a component that takes care of the coordination and consistency of the jobs, moving data across application components, and reacting to events both in the client and the server. In addition each one of these moving parts may come with a different programming models or data models, requiring switching between multiple development approaches and/or data marshaling to get a full understanding of the overall application architecture and mechanics across the board.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a distributed computing system. The method includes acts for scheduling and dispatching jobs for a plurality of different entities. The method includes receiving at a work coordinator, one or more actions associated with a job. The method further includes storing in a log at the work coordinator, keyed on a job key, state for the one or more actions and a list of the one or more actions. The method further includes making calls to one or more worker processes to cause the worker process to perform actions associated with the job. As a result of making calls to one or more worker processes, the method further includes receiving at least one of a change to the list of remaining actions or the state.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments may use continuation based runtimes in a backend and a backend job coordinator to perform background work. The job coordinator may include a log. Jobs are added to the log, where the jobs include a number of work items or actions. The jobs may have state associated with them. The state may be associated with the entire job or with one or more individual actions. By using continuation based runtimes, the actions can be performed in a processor independent fashion dehydrating the state and rehydrating the state when it is time to deliver the actions to a processor. As actions are performed, the job and/or state in the log can be updated. Some examples of background jobs include: sending email, accessing a remote API (e.g. posting something to a social network feed), fetching posts from an RSS feed, converting an image thumbnail, or rendering a PDF. Other examples may include multi-stage jobs, such as for example, submitting an order to an external system, polling, checking for results every n minutes, etc. Other use cases may be administrative, such as taking backups or synchronizing data.

Embodiments illustrated herein implement background job capabilities in a web-hosting environment (like for example Windows Azure® Web Sites available from Microsoft® Corporation of Redmond Wash.). Using continuation based runtimes, embodiments may include the capability to chain together background jobs and pass state between actions associated with the same job. This allows users to easily model more complex background work such as polling loops and multi-party agreements. This can also reduce costs as typically a polling loop requires a single dedicated processor to continuously poll. However, embodiments herein, by sharing state, may be able to perform shared polling among multiple different processors and only when specific polling actions need to occur.

Figure 1:
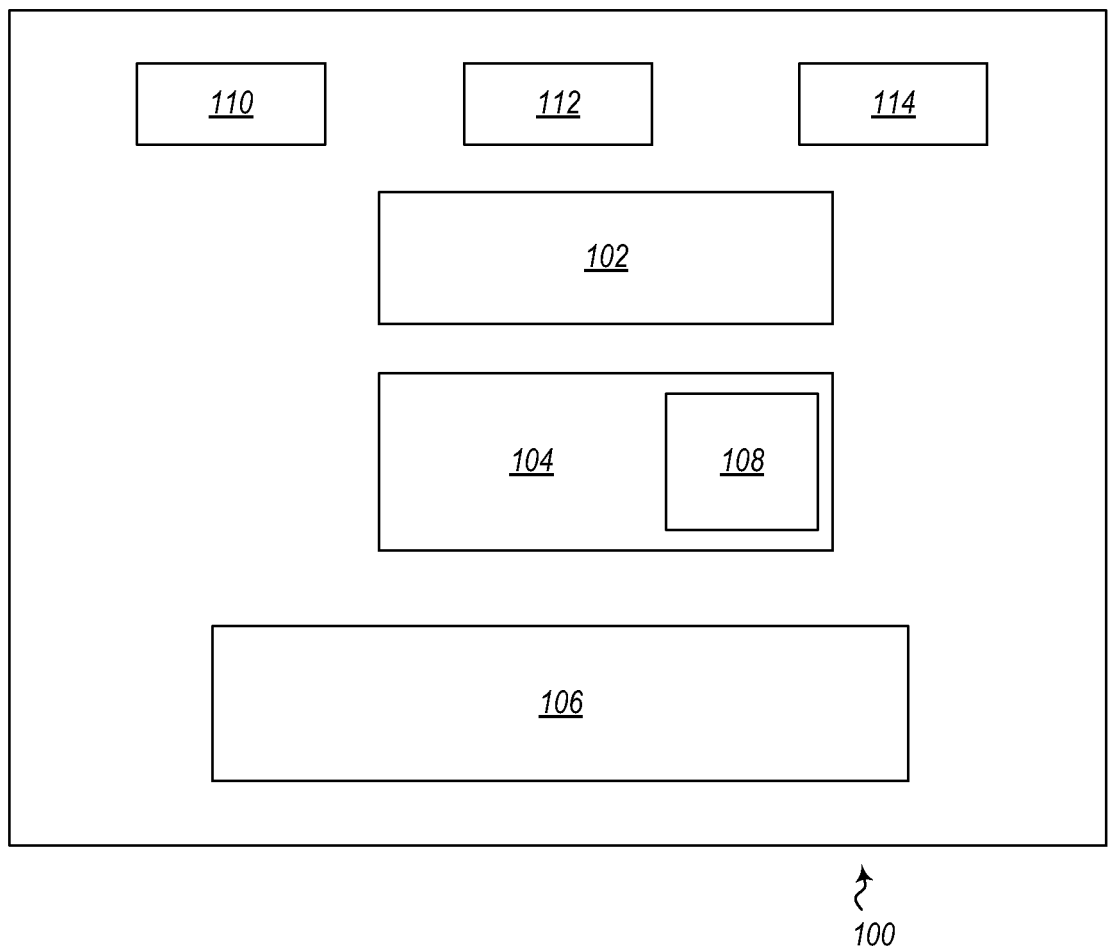
FIG. 1 illustrates a system for performing background jobs.

Referring now to FIG. 1, an example is illustrated. FIG. 1 illustrates a system 100 including a front end 102, a backend job coordinator 104 and a backend 106 of workers.

The front end 102 may include various interfaces that allow a user to interact with a distributed service. In the illustrated example shown in FIG. 1, while other types of services may be used, the front end 102 is a Representational State Transfer beyond the traditional queue, etc.) to consumers of other "user logic hosting" components.

A set of actions are deployed at the backend coordinator 104 (e.g. a workflow service running on Windows Azure™). These actions provide pre-built functionality that will be configured by callers of the system 100. These actions are composite actions (i.e. actions composed of other actions).

A job can be placed into a log 108 at the backend job coordinator 104. The log stores jobs keyed on a key. For example, in the example code illustrated below, a job may be added to a log 108 and keyed on the OrderId parameter. The job includes an action for placing an order based on the call to placeOrder.cshtml. State may be associated with a job. For example, in the example below, the state may include the values associated with OrderId, Email, ProductId, and Quantity.

The code below is an example demonstration:

| WEB (Razor) | WORKER (PlaceOrder.cshtml) |
|---|---|
| @using Microsoft.ServiceBus.Web;<br>string orderId = Guid.NewGuid( ).ToString( );<br>Job.Start(orderId, "~/PlaceOrder.cshtml",<br>   new {<br>      OrderId = orderId,<br>      Email = Request["orderEmail"],<br>      ProductId = Request["ProductId"],<br>      Quantity = Request["orderQty"],<br>   });<br>Response.Redirect(<br>   "~/OrderSuccess/"+orderId): | dynamic state = JobContext.State;<br>var product =<br>   AppLogic.GetProduct(state.ProductId);<br>AppLogic.SendSubmittedEmail(<br>   state.OrderId,<br>   state.Email,<br>   product,<br>   state.Quantity); |

(REST)-ful service. In some embodiments, this service may be built on the ASP.NET MVC Web API available from Microsoft® Corporation or on other appropriate components. The front end 102 provides an access point for a user to interact with the system 100 to add jobs or additional actions to jobs. The front end may also include functionality for providing a user with access to information about runtime state. This information can be current runtime state or state for a job that has been set or collected over time. This may be used to provide reporting functionality to the user or so that a user can assess what portions of a scheduled job have been completed.

In the example illustrated in FIG. 1, the front end 102 is illustrated as interacting with three different components including a browser client 110, a mobile services interface 112 and an application hosting framework 114. These different components can provide different access points into the front end 102 and different methods for user to access the front end 102. In some embodiments, the browser client 110 may be Internet Explorer® available from Microsoft® Corporation of Redmond Wash. The mobile services interface 112 may be Windows Azure® Mobile Services available from Microsoft® Corporation of Redmond Wash. The application hosting framework 114 may be Windows Azure® Web Sites available from Microsoft® Corporation of Redmond Wash.

The backend coordinator 104 may be a workflow service with access to a number of different workers in the backend 106 configured to process continuation based runtime workflows. One example of such a service is Windows Azure™ Workflow Service available from Microsoft® Corporation of Redmond Wash. The job coordinator allows workflow-like semantics (e.g. state coordination, persistence, lifetime management, etc.) along with advanced queuing semantics (e.g. retry, push instead of pull, advanced log manipulations In the code above, a snippet shows code at the web front end (i.e. a web server) (left) and the backend worker process (right). Notice how both are written in a synchronous fashion (in this case using technologies like C#, Razor, and ASP.NET available from Microsoft® Corporation of Redmond Wash.). In the left snippet a job start request is submitted to the job coordinator to place an order. The right snippet demonstrates the code that reacts to the request. In particular, the code gets the state of the order (provided in the job start request as shown in left snippet) and sends an email. The important artifacts to consider are Job and JobContext. The former is the one that is used to start the job, the latter contains information about that job (i.e. the state). To get that state, the user did not need to perform any marshaling nor conversion. Rather, the user just uses the regular web development artifacts that they would for any other solution. The user is abstracted away from the mechanics of coordination and is provided with a clean programming model based on what they use today. Illustrating from another perspective, "Job" is used when outside of the context of a job's internal execution logic (i.e. there is no "current" job). "JobContext" is used within the context of an executing job (i.e. this is a callback for the job and therefore the abstraction layer knows which job is being operated on. Start is always called outside the context of the job, as it cannot be in the context of a job that does not exist. However, one job could start a second job. All other manipulations are available both on Job and JobContext depending on whether embodiments are in a callback from the job (so the abstraction layer knows which job is being operated on) or not. "Job" may be treated as an "explicit job key" and JobContext as an "implicit job key."

Another aspect to notice from the snippet above is related with state management. In particular, users just provide state, but they do not need to perform any transformation and/or marshaling to push that state between the client and the server. In addition, state can be provided on a single request basis where the state applies to just a single action, for a set of requests where the state applies to a set of actions, or there can be state that is available and applicable to the entire job. Further additional actions and/or state can be applied to a job. For example, consider the following snippet in conjunction with the previously presented snippets:

```
@using Microsoft.Web.Spica;
@using MyBakeryApp;
@{
  Layout = null;
  bool pollAgain = true;
  dynamic jobState = JobContext.Current.State;
  if (jobState.LastStatus == AppLogic.CanceledStatus)
  {
    pollAgain = false;
  }
  else
  {
    string newStatus = AppLogic.GetWarehouseStatus(jobState.OrderId, jobState.WarehouseId);
    if (jobState.LastStatus != newStatus)
    {
      AppLogic.UpdateStatus(jobState.OrderId, newStatus);
      AppLogic.SendUpdateEmail(jobState.OrderId, jobState.Email, newStatus);
      jobState.LastStatus = newStatus;
      if (newStatus == AppLogic.DeliveredStatus)
      {
        pollAgain = false;
      }
    }
  }
  if (pollAgain)
  {
    // We aren't in the final state yet so we'll
    // keep polling our warehouse.
    JobContext.Current.ScheduleRequest(
        "~/CheckStatus.cshtml",
        TimeSpan.FromSeconds(30));
  }
  else
  {
    // We complete rather than cancel because we
    // want to let any other pending callbacks drain.
    JobContext.Current.Complete( );
  }
}
```

In the preceding snippet, embodiment implementing polling functionality to determine if a job has been cancelled, updating of job state; and adding new actions to a job. The example also illustrates that actions can be added and scheduled on a 30 second delay.

An additional example is now illustrated:

In the case above, there is a rich interaction between the frontend logic (right side) and a backend process (left side). The code snippets above show how to queue work, queue work with a delay, resume work, and resume work with delay (from the scheduler perspective). They also show how to get state, schedule more work, continue work, cancel work, or complete work (from the job page perspective). All this is happening using a synchronous (C# in this case) programming interface that abstracts the users from all the challenges of distributed asynchronous and long running execution.

Illustrating now additional details, new work actions can be added to the log 108 of the backend coordinator 104. The work actions are stored in the log 108 keyed on a job key. For example, a key may be a job id, order number, user identification, session identification, or some other identifier that can be used to key a job. The job and/or actions in the job, as noted above, are also associated with state. Notably, embodiments may be implemented where background work can add additional background work. For example, executing an action may cause additional action or actions to be added to a job. The additional background work may be associated with the continuing job state and/or may have individual action state associated with it.

The state may be data values associated with a job and/or action. Various examples of specific state variable are illustrated in detail above. State can be updated in the log. For example, a user can update the state manually though a user interface. Alternatively or additionally, state can be updated by performing actions. Performing actions may cause the state to be updated as part of the execution of an action. State can be global for all actions for a key corresponding to a job or local to only a particular action.

Actions can be sent from the log 108 to workers at the backend 106. When workers work on the actions, they will send changes to the log 108. For example, they may send new actions to the log 108 to be added to a job or cause actions to be removed from the log 108 for a job. Actions can also cause changes to the state associated with a job.

The log 108 is queryable in that a user can see what actions are in the log 108, including what actions have been sent out from the log 108 to workers at the backend 106 and what items are still to be performed. A user can also query the log 108 to examine state at the log 108.

As noted above, some embodiments may implement cancel functionality. A "cancel" command can be sent which removes all state and any remaining actions from the log.

Some embodiments may implement the ability to declare the log complete. When a "complete" command is sent to the

| Scheduling Jobs | Job Page |
| --- | --- |
| // Enqueuing Work<br>var id = Job.Start("~/PlaceOrder",<br>            jobState);<br>// Enqueuing Work with Delay<br>var id = Job.Start("~/PlaceOrder",<br>  jobState, TimeSpan.FromSeconds(10));<br>// Resuming work<br>Job.ScheduleRequest(id, "~/PlaceOrder",<br>          requestState);<br>//Resuming work with Delay<br>Job.ScheduleRequest(id,<br>    "~/PlaceOrder",<br>    requestState,<br>    TimeSpan.FromSeconds(10)); | // state scoped to this request<br>var input = JobContext.Current.RequestState;<br>// state scoped to this job<br>Var state = JobContext.Current.CurrentState;<br>// Scheduling more work<br>JobContext.Current.ScheduleRequest(<br>              "~/CheckStatus",<br>              requestState);<br>//Continuing wok with delay<br>JobContext.Current.ScheduleRequest(<br>    "~/CheckStatus",<br>    requestState,<br>    TimeSpan.FromSeconds(5));<br>// Cancel any outstanding callbacks<br>JobContext.Current.Cancel( );<br>// Explicitly finishing work (optional)<br>JobContext.Current.Complete( ); | log 108, this causes the system to block any new actions from being added to the log 108. The actions remaining in the log 108 are processed. The state is removed when all actions have been processed.

As illustrated above, embodiments implement a simple programming model for a complex task. In particular, embodiments are implemented such that programmers write synchronous code using their familiar language and the infrastructure manages asynchronous execution and eventing automatically for them. As a result, customers write synchronous but get all the benefits of asynchronous execution.

Figure 2:
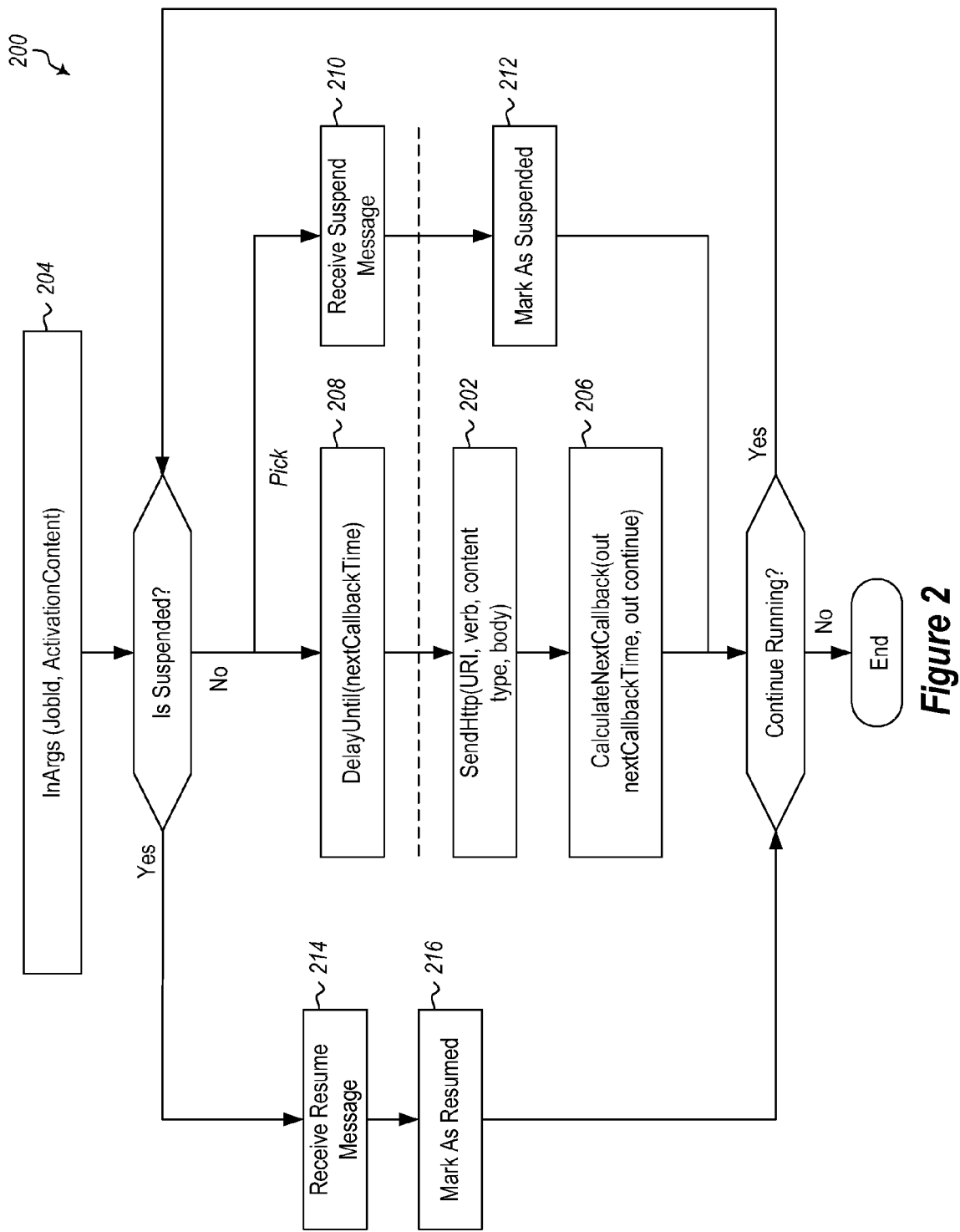
FIG. 2 illustrates a flow diagram illustrating acts for performing background actions.

Embodiments may leverage a continuation based runtime to ensure consistency and manage events. In particular, embodiments may use a continuation based runtime for driving long-running distributed asynchronous work. The work can performed in a processor independent way using continuation based runtimes. State associated with actions can be dehydrated, and rehydrated when it is time to process the action. FIG. 2, discussed in more detail below, demonstrates the design of the artifact running in the continuation based runtime to take care of managing the state and raising the events as appropriate. Some embodiments may be implemented using Windows Workflow Foundation from Microsoft Corporation of Redmond Wash. In this case, FIG. 2 shows the set of actions that compose the workflow that manages the jobs and the events.

The execution flow of an application resides in the application itself and not in an external control flow artifact. Because of this, embodiment may differ from some previous solutions which had a "decider" or similar concept that orchestrates the interaction between different components. In contrast, using some embodiments described herein, customers just write their applications as usual and the jobs infrastructure will do all the work on their behalf behind the scenes without requiring any additional artifact programmed by the user.

The use of the continuation based runtime provides several benefits including visibility into the job management logic (similar to what is displayed in FIG. 2) and transparency (visibility into details of execution). The transparency provides visibility into the details of the execution, providing insight to developers and administrator about the execution of their service. All the details that make that sync code distributed and long-running asynchronous are offered to the users for debugging, health management, or monitoring purposes.

In addition to transparency, the continuation based runtime offers internal and external control over execution. In the external case, customers can decide to cancel, suspend, or resume a given job. In the internal case, they can provide a job manager with modeled cancellation semantics. For example Windows Workflow Foundation from Microsoft Corporation of Redmond Wash. offers the ability of modeling cancellation through a CancellationScope activity.

The process independence and durability aspect of the continuation based runtime may provide extra agility and resilience to the distributed asynchronous process. In particular continuation based runtimes are not tied to any process nor machine, so they can be loaded in any other machine participating in the implementation topology of the system and continue with their execution without any involvement of the end user. As a result, small pieces of code can be moved around different processing nodes in a farm, supporting scaling and resilience scenarios.

FIG. 2 shows an example of a flow 200 for running an action 202. The action 202 shown in FIG. 2 is a general representation and the action can be further abstracted, to the point that the action can be any composition of any existing actions (e.g. sending an email and an http message in parallel).

A user can specify various arguments 204. For example, a user can specify a job identifier (this could be generated automatically) and activation content. Activation Content may be the combination of (1) optional job state and/or optional initial action(s) including optional action state. For example, in the example, shown above, the Start parameters included the jobId, an action ("~/PlaceOrder.cshtml"), and job state (new{OrderId= . . . }). Activation Content may also include optional things like other look-up keys (such as in the example above additional keys beyond the job ID) and/or configuration values (for example, embodiments may allow the user to control how many times actions should be retried, how frequently they should be retried, what credentials to use by default, etc.).

Embodiments may implement a set of control operations within the workflow itself so that a long-running recurrence can be suspended, resumed, or updated mid-flight. Cancellation or termination notifications may also be implemented within the workflow itself, but in some embodiments this may not be needed as those notifications may be provided natively by a workflow service, such as the backend 106. In particular, Windows Azure™ Workflow Service provides these features natively.

FIG. 2 illustrates a CalculateNextCallback module 206. The inputs to the CalculateNextCallback module 206 may be the log 108 of actions and the result of the action just completed. This can be used to take the response of the previous action, determine how that modifies the log, and then use some logic to select the next item from the log. For example, actions may simply be processed in a FIFO order. Alternatively or additionally, if each action has a priority associated with it CalculateNextCallback 206 would choose the highest priority item from the log. In another alternative, the system 100 can support simple recurrence (e.g. run every 5 minutes) or more advanced recurrence patterns (e.g. run the second Wednesday of every month). The recurrence can be calculated by the CalculateNextCallback module 206. A DelayUntil module 208 can delay actions until they are scheduled to be run.

Actions are ultimately converted into a set of operations on the back-end 106. Some embodiments may be limited to only support HTTP actions so as to limit the jobs that can be coordinated to non-CPU intensive orchestrations of network calls. In the example illustrated above, an action will send an HTTP request to the provided target URL with the given headers and content. A user can provide optional actions that embodiments can, for example, send an HTTP request to upon either success (HTTP 2XX response code) or failure (HTTP non-2XX response code).

While the above example illustrates limiting to HTTP actions so as to limit the actions that can be performed to non-CPU intensive orchestrations of network calls, other embodiments may be able to allow other actions that still limit embodiments to non-CPU intensive orchestrations of network calls. For example, embodiments may allow for sending mail, posting social media updates, simple administrative actions, etc. Simple chaining of non-CPU bound http actions, while maintaining an intermediate state, can enable very powerful scenarios. For instance, one scenario may include obtaining an authentication token from an access control service, and then calling into a restricted resource. Another is the ability of modeling a complex state machine using a simple switch statement in the callback. Chaining actions is enabled natively by using continuation based runtimes.

The following illustrates an example HTTP action in accordance with the principles described previously herein.

```
{
    "type": "http",
    "request":
    {
        "uri": "http://contoso.com/foo",         // required
        "method": "PUT",                          // optional (default to POST)
        "body": "Posting from a timer",           // optional
        "headers":
        {
            "Content-Type": "application/json"
        }
    },
    "onSuccess": "http://contoso.com/success",    // optional, called for 2XX
    "onError": "http://contoso.com/error",        // optional, called for non-2XX
},
```

Embodiments may include error actions. For example, the user can provide an action that will be executed in the case of a failure of the primary action. This can be used for logging responses, or more complex error handling logic. Just like the primary action, the error action can be simple or composite logic based on other actions.

Embodiments may include support for metadata. The metadata is a set of user provided key-value pairs. This can be used to query for jobs and/or add descriptions to the job. Some embodiments do not allow an arbitrary number of key-value pairs. In some embodiments, the user is limited to a small number such as ten metadata values, which limits the impact an individual user can have on the data store.

Some embodiments may include support for status information. An example of status properties is as follows:

```
"status": "suspended", // running, suspended, completed, or canceled
"statusDetails": "suspending for the winter holidays", // optional
```

In some embodiments, two pieces of job status information can be provided by the user. The first is an enumeration of whether the job is running, suspended, completed, or canceled. The user can HTTP PUT jobs in the running or suspended status, and HTTP PATCH active jobs to any other status. If a job has been completed or canceled, that is a final status that cannot be updated (though the job can still be HTTP DELETEd). In addition to this enumeration, a statusDetails field is available for users to provide documentation on the reason for their status change.

The following illustrates job management. Embodiments may be implemented where all of the REST APIs are relative to the tenant's base address (e.g. http://dynamicjobs.cloudapp.net/contoso/). The URL format accounts for a tenant having multiple "users" of the system 100, and system job IDs are embedded in that URL. A system job is therefore accessed at the following URL (a "job address"):

http://timers.cloudapp.net/<tenant_name>/jobs/<job-name>

Some operations support batching. In these cases, key-value tags can be provided as parameters to the jobs URL (i.e. /jobs(key1=value1,key2=value2).

The following illustrates details related to creating a remote based, job for one very specific example embodiment. Remote based, jobs are created through a simple HTTP PUT operation to a job's address. The resource name is the public name of the job. The payload is a JSON object representing the job. Additional metadata can be provided as part of creating a job, which allows a user to query for sets of jobs (for example, actions can be associated with different users of my multi-tenant cloud based system application). If a job name is not provided in the HTTP PUT request (either through the URI or the payload), then one will be generated by the service.

This call results in an HTTP 201 message (indicating that the request has been fulfilled and that a new job has been created) on success. The location of the newly created job will be provided in the HTTP Location response header.

Embodiments may include functionality for listing remote based jobs. The status of an individual job can be accessed by a HTTP GET call to a job's address. The full list of a user's jobs can be accessed by excluding a jobid in the HTTP GET call (i.e. /jobs).

Embodiments may include functionality for filtering jobs by metadata. To fetch the status of all jobs related to say, an application, the user would have to query using his/her provided metadata {key, value} pairs. For example, a HTTP GET call with <job-address>/jobs(service=routeplanner, component=real-time-traffic-update).

Embodiments may include functionality for deleting a remote based, time bound, or period scheduling service job. To delete a remote based, time bound, or period scheduling service job, a user may send a HTTP DELETE request to a job's address. The full list of a user's jobs can be deleted by excluding a jobid from the HTTP DELETE call (i.e. /jobs). Delete also supports bulk operations based on metadata. Deleting a job differs from canceling a job in that deleted jobs will have their history purged, and they will never be returned from a subsequent HTTP GET call. If the user tries to HTTP DELETE a job that has already been DELETEd, the system 100 will return an HTTP 404 Not Found response.

Some embodiments may include functionality for updating a job. Jobs can be updated through an HTTP PATCH operation to a job's address. In some embodiments, the format of the request is the same as that for creating a job, though if a field is unspecified embodiments will carry forward the current value. If the remote based, time bound, or period scheduling service job is a currently executing a recurring job, then the web service will send a notification to the workflow instance to update its job configuration (such as its recurrence/action/start time). Update also supports bulk operations based on metadata. In these cases, all of the matching jobs will be updated with the deltas provided in the HTTP PATCH payload.

In some embodiments, the following values are not allowed in a HTTP PATCH request:

"status": <XXX>
"id": <any value that doesn't match the URI-specified ID>
"state": "completed" (other state values are allowed)

Some embodiments include functionality for canceling an active job. For example, jobs can be canceled by sending a HTTP PATCH that includes "status": "canceled". The reason for cancellation can optionally be included in a metadata property, such as the "stateDetails" property illustrated herein, of the job.

Embodiments may include functionality for suspending an active job. A remote based, time bound, or period scheduling service job can be suspended in the following ways:

1. It is initially created as a suspended job, to be enabled at a later time; or
2. It is a recurring job that the user updates with a POST to <jobaddress>/suspend Suspended jobs have a status of "Suspended". Alternatively, the user can update as a PATCH with "status": "suspended".

In both cases, the reason for suspending the job can optionally be included in a metadata property, such as the "stateDetails" property illustrated herein, of the job. FIG. 2 illustrates at 210 that a suspend message is received. This causes the action to be marked, as illustrated at 212, as suspended.

Embodiments may include functionality for resuming a suspended job. For example, suspended jobs may be resumed by sending a HTTP POST request to <jobaddress>/resume. Alternatively, suspended jobs are resumed by sending a PATCH that includes "status": "running". The reason for resumption can optionally be included in the "statusDetails" property of the job. FIG. 2 illustrates at 214 that a resume message can be received. The action, as illustrated at 216, can be marked as resumed to allow the action to resume.

Embodiments may include functionality for getting the history of a job. When remote based jobs execute, they record a log of their progress. This can be accessed through a HTTP GET call to <jobaddress>/history. The response is a JSON array of history objects. For example:

```
[
  {
    "timestamp": "2012-05-01T18:56:46",
    "message": "Job Created"
  },
  {
    "timestamp": "2012-05-01T18:56:46.7",
    "message": "Sucessfully executed action PlaceOrder.cshtml"
  },
  {
    "timestamp": "2012-05-01T19:57:00.753",
    "message": "Waiting until '5/1/2012 8:57:00 PM' to execute action PollForChanges.cshtml"
  }
]
```

The query parameters may conform to a backend's native support for querying instance metadata. For example, in some systems, the metadata key length cannot exceed 50 characters and value cannot exceed 255 characters. In some embodiments, the query itself is an exact match on the metadata value and all of the provided metadata keys must match.

In some embodiments, the remote based system service endpoint is exposed only through https, to help mitigate information disclosure threats.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
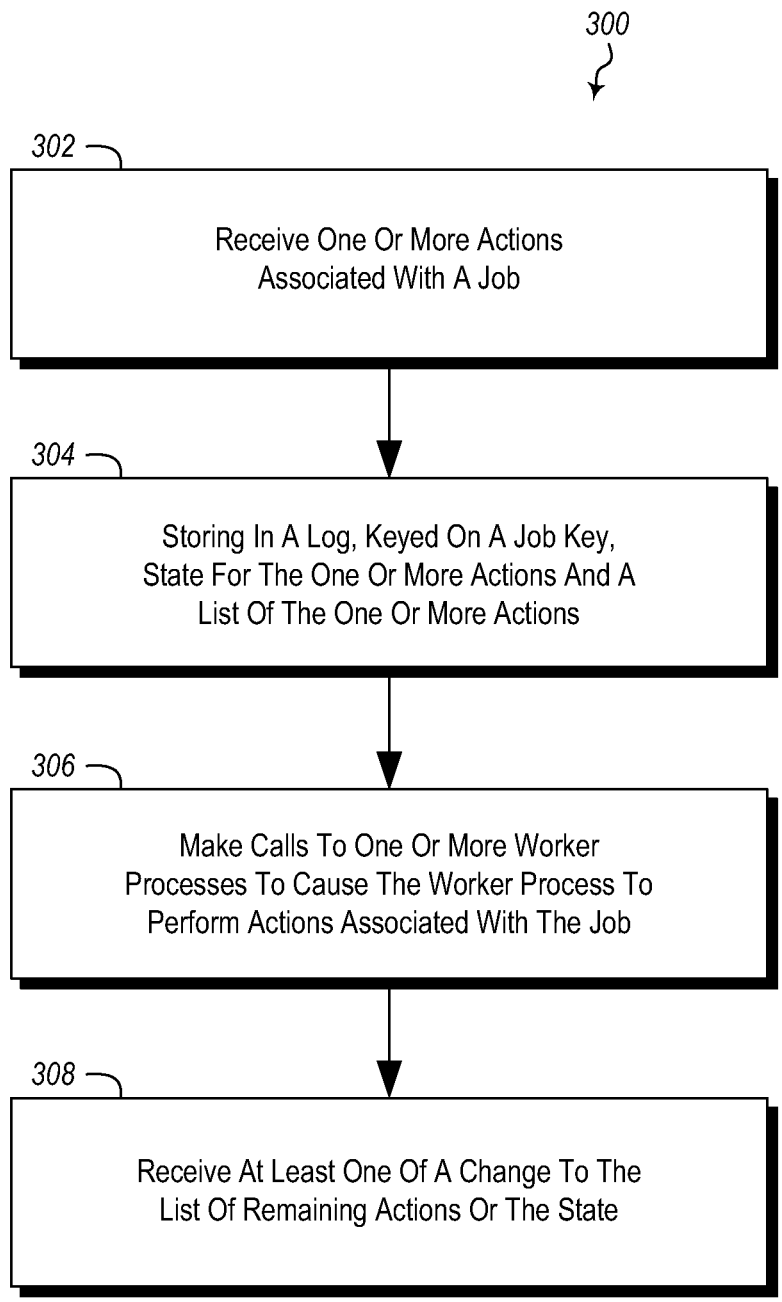
FIG. 3 illustrates a method of method of scheduling and dispatching jobs.

Referring now to FIG. 3, a method 300 is illustrated. The method 300 may be practiced in a distributed computing system. The method 300 includes acts for scheduling and dispatching jobs for a plurality of different entities. The method 300 includes receiving one or more actions associated with a job (act 302). For example, the backend coordinator 104 may be a work coordinator that receives actions for a job.

The method 300 further includes storing in a log, keyed on a job key, state for the one or more actions and a list of the one or more actions (act 304). For example, the backend coordinator 104 may store in the log 108 a job, a key associated with the job, and state for the job. The job may have a number of actions stored in the log 108. The key may be received from the same entity that provided the one or more actions. Alternatively, the key may be generated automatically. In yet another alternative, the key may be provided by some other entity. Similarly, the state may be provided by the same entity that provided the one or more actions. Alternatively or additionally, the state may be provided by some other entity. In some embodiments, the state may be initialized state with no meaningful values, but rather is in an initialized state waiting for addition of state or updates to state.

The method 300 may further include making calls to one or more worker processes to cause the worker process to perform actions associated with the job (act 306). For example, actions may be provided to the backend 106, where the actions can be assigned to workers to perform the actions.

The method 300 may further include receiving at least one of a change to the list of remaining actions or the state. For example, as a result of a worker at the backend performing an assigned action, additional actions may be added to a job in the log 108 and/or state for the job in the log 108 may be updated.

The method 300 may be practiced where the job key is provided ambiently by the system. For example, a system may automatically assign keys to jobs when they are placed into the log 108.

The method 300 may be practiced where one or more of the actions is associated with a time that the actions should be executed. For example, an absolute time may be specified, such as "December 29 at 3:30 P.M.". Alternatively, the time may be specified as a delay. For example, an indication may be made that an action should be performed in 30 minutes.

The method 300 may further include receiving a completion notice. This causes the system to prevent any additional actions to be added to the list, finish processing actions in the list and remove any state associated with the job when all actions in the list have been processed. In some embodiments, the method 300 may be practiced where receiving a change to the list of remaining actions includes receiving the completion notice.

The method 300 may further include receiving a cancellation notice which causes the system to remove any actions remaining in the list and to remove any state associated with the job. In some embodiments, the method 300 may be practiced where receiving a change to the list of remaining actions includes receiving the cancellation notice.

The method 300 may further include providing to a user a list of actions in the log. For example, in some embodiments, the list of actions in the log includes a list of actions already performed. Alternatively or additionally, the list of actions in the log includes a list of actions yet to be performed. The method 300 may further include providing to a user the state associated with the job. For example, the user can query the system to determine values of state associated with a job.

The method 300 may be practiced where at least a portion of the state for the one or more actions is associated with the job globally. Alternatively or additionally, the method 300 may be practiced where at least a portion of the state for the one or more actions is associated with an individual action.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below.

Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a distributed computing system, a method of scheduling and dispatching jobs the method comprising:
    receiving at a work coordinator, a list of actions associated with a job to be performed as a background job, the work coordinator comprising a log and the work coordinator having access to a plurality of worker processes for performing actions in the background;
    storing in the log at the work coordinator, the list actions, a state for the list of actions and a job key associated with the job;
    making calls to the plurality of worker processes to cause the plurality of worker processes to perform one or more actions from the list of actions associated with the job;
    as a result of making calls to the plurality of worker processes performing the one or more actions from the list of actions by the plurality of worker processes;
    updating the log by the plurality of worker processes in response to performing and processing the one or more actions from the list of actions by adding a new actions to the list of actions associated with the job, removing actions from the list of actions associated with job and changing state associated with the job in the job log; and
    receiving a completion notice at the work coordinator and based on the completion notification, prevent any additional actions to be added to the list of actions in the log, finish processing remaining actions in the list of actions and remove any state associated with the job when all actions in the list have been processed.

2. The method of claim 1, wherein the job key is provided automatically by the system.

3. The method of claim 1, wherein the one or more of the actions is associated with a time that the actions should be executed.

4. The method of claim 3, wherein the time is an absolute time.

5. The method of claim 3, wherein the time is a delay relative to a current time.

6. The method of claim 1, further comprising receiving a cancellation notice which causes the system to remove any actions remaining in the list and to remove any state associated with the job.

7. The method of claim 1, further comprising providing to a user a list of particular actions in the log.

8. The method of claim 7, wherein the list of particular actions in the log comprises a list of actions already performed.

9. The method of claim 7, wherein the list of particular actions in the log comprises a list of actions yet to be performed.

10. The method of claim 1, further comprising providing to a user the state associated with the job.

11. The method of claim 1, wherein at least a portion of the state for the one or more actions is associated with the job globally.

12. The method of claim 1, wherein at least a portion of the state for the one or more actions is associated with an individual action.

13. A distributed computing system for scheduling and dispatching jobs the system comprising:
  one or more processors; and
  one or more computer readable media, wherein the one or more computer readable media comprise computer executable instructions that, when executed by at least one of the one or more processors, cause at least one of the one or more processors to perform the following:
  receive at a work coordinator, a list of actions associated with a job to be performed as a background job, the work coordinator comprising a log and the work coordinator having access to a plurality of worker processes for performing actions in the background;
  store in the log at the work coordinator, the list actions, a state for the list of actions and a job key associated with the job;
  make calls to the plurality of worker processes to cause the plurality of worker processes to perform one or more actions from the list of actions associated with the job; and
  as result of making calls to the plurality of worker processes performing the one or more actions from the list of actions by the plurality of worker processes;
  update the log by the plurality of worker processes in response to performing and processing the one or more actions from the list of actions by adding a new actions to the list of actions associated with the job, removing actions from the list of actions associated with job and changing state associated with the job in the job log; and
  receive a completion notice at the work coordinator and based on the completion notification, prevent any additional actions to be added to the list of actions in the log, finish processing remaining actions in the list of actions and remove any state associated with the job when all actions in the list have been processed.

14. The system of claim 13, further configured to receive a cancellation notice which causes the system to remove any actions remaining in the list and to remove any state associated with the job.

15. The system of claim 13, further configured to provide to a user a list of particular actions in the log.

16. The system of claim 13, further configured to provide to a user the state for the one or more actions associated with the job.

17. The system of claim 13, wherein at least a portion of the state for the one or more actions is associated with the job globally.

18. A distributed computing system for scheduling and dispatching jobs, the system comprising:
  one or more processors;
  a front end configured to receive user input comprising background jobs; and
  a backend coordinator, comprising a log and having access to a plurality of backend workers,
  wherein the log is configured to:
    store a list of actions associated with a background job,
    store a key associated with the background job, and
    store state that applies to each action from the list of actions of the background job;
  wherein the plurality of backend workers are configured to:
    receive at least one action from the list of actions from the backend coordinator;
    process and perform the at least one action from the list of actions received from the backend coordinator; and
    update the log in response to processing and performing the at least one action by:
      adding new actions to the list of actions associated with the background job;
      removing actions from the list of actions associated with the background job; and
      changing state associated with the background job; and
  wherein the backend coordinator receives a completion notice and, based on the completion notification, prevents any additional actions to be added to the list of actions in the log, finishes processing actions remaining in the list, and removes any state associated with the background job when all actions in the list have been processed.

* * * * *